No. 794,829. PATENTED JULY 18, 1905.
G. H. WINSLOW.
HOLDER FOR LENSES OF EYEGLASSES, &c.
APPLICATION FILED APR. 4, 1904.
2 SHEETS—SHEET 1.
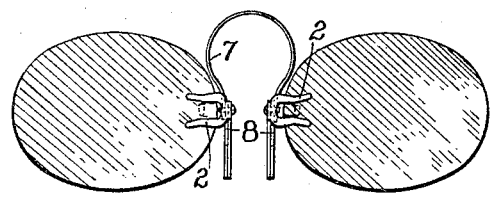
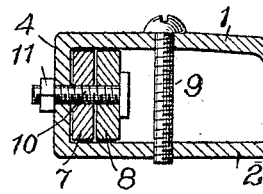
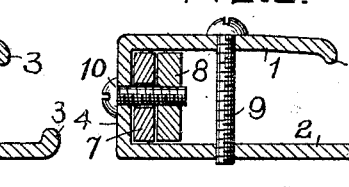
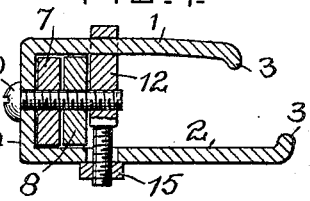
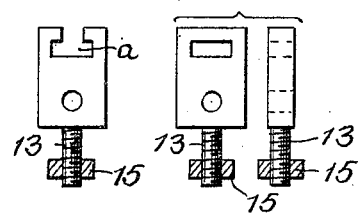
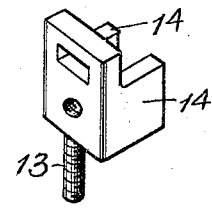
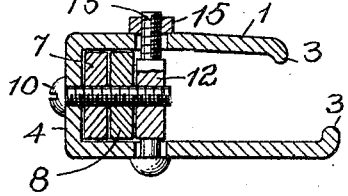
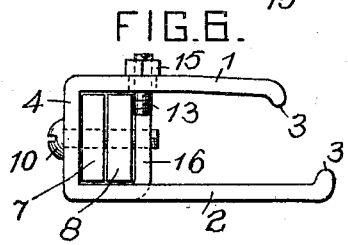
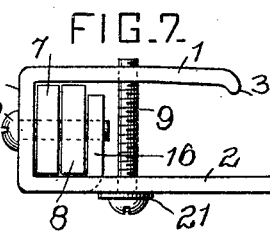
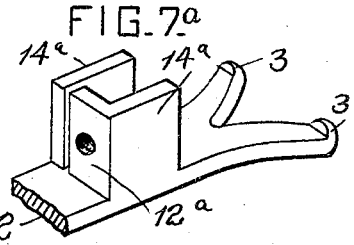
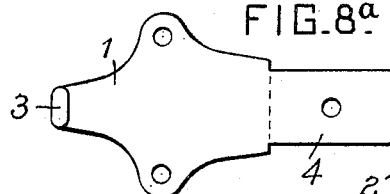
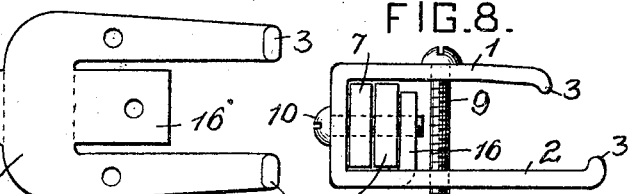
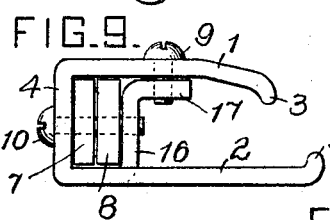
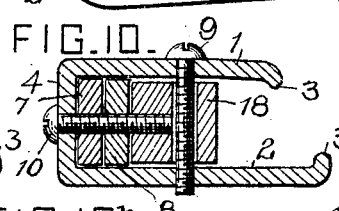
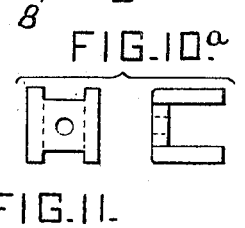
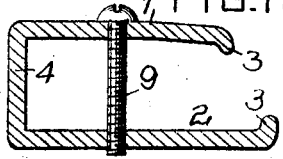

No. 794,829. PATENTED JULY 18, 1905.
G. H. WINSLOW.
HOLDER FOR LENSES OF EYEGLASSES, &c.
APPLICATION FILED APR. 4, 1904.

2 SHEETS—SHEET 2.

WITNESSES:
Herbert Bradley.
Fred Kirchner.

George H. Winslow INVENTOR
by Christy and Christy
ATT'YS.

No. 794,829. Patented July 18, 1905.

UNITED STATES PATENT OFFICE.

GEORGE H. WINSLOW, OF BELLEVUE, PENNSYLVANIA.

HOLDER FOR LENSES OF EYEGLASSES, &c.

SPECIFICATION forming part of Letters Patent No. 794,829, dated July 18, 1905.

Application filed April 4, 1904. Serial No. 201,434.

*To all whom it may concern:*

Be it known that I, GEORGE H. WINSLOW, a citizen of the United States, residing at Bellevue, in the county of Allegheny and State of Pennsylvania, have invented or discovered certain new and useful Improvements in Holders for Lenses of Eyeglasses, &c., of which improvements the following is a specification.

The invention described herein relates to certain improvements in clamps or grips for securing the spring and nose-guard to the lenses of eyeglasses; and the invention has for its object the employment of a U-shaped grip or clamp the legs of which not only grip the lens, but also form a pocket for the reception of the end of the spring and the ear of the nose-guard.

The invention is hereinafter more fully described and claimed.

Figure 12:
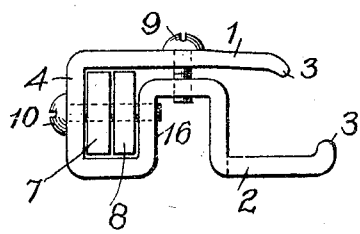
Figure 13:
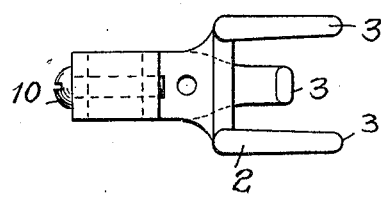
Figure 14:
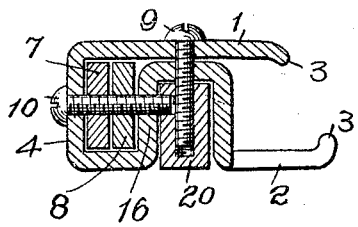

In the accompanying drawings, forming a part of this specification, Figure 1 is an elevation of a lens of an eyeglass, showing the spring and nose-guard secured thereto by my improved clamp. Figs. 2 to 10, inclusive, illustrate modifications of parts of the clamp. Figs. 4ª, 4ᵇ, and 4ᶜ illustrate modifications of the cross-bar shown in Fig. 4. Fig. 7ª shows a modification of the grip illustrated in Fig. 7. Fig. 8ª illustrates the blank from which the clamps shown in Fig. 8 are formed. Figs. 10ª and 10ᵇ illustrate modifications of the nut or cross-bar shown in Fig. 10. Fig. 11 illustrates a modification of the construction shown in Figs. 1 to 10. Fig. 12 illustrates a modification of Fig. 11. Fig. 13 is a plan view of Fig. 12, and Fig. 14 shows the screws for shifting the clamping and gripping members engaging a nut in the recess formed in one of the members.

In the practice of my invention the clamp is U-shaped, and the members or legs 1 and 2 thereof are provided at their outer ends with points 3 for engaging the lens of the eyeglass. In this construction the clamp is made sufficiently long to provide a pocket at its inner end for the reception of the spring 7 and ear 8 of the nose-guard. The legs or members 1 and 2 are drawn toward each other to grip the lens by means of a screw 9 passing through one of the legs and engaging a threaded opening in the other leg. By this inward movement of the legs or members 1 and 2 the edges of the spring and ear on the nose-guard are also gripped, so as to hold the same in position. The spring and ear of the nose-guard are further secured by means of a screw 10 passing through the end wall 4 of the clamp and one of the parts, either the spring or ear, and screwing into the other part, as shown in Fig. 3. If desired, the screw may pass through the end wall 4, the spring and ear of the nose-guard, and the parts to be held in position by a nut 11, as shown in Fig. 2.

As shown in Figs. 4 and 5, a cross-bar 12 may be interposed between the legs or members 1 and 2. In the construction shown in Fig. 4 this cross-bar 12 is provided with an undercut slot *a* at one end for the reception of one of the members, as 1, while the opposite end is provided with a threaded stem 13 passing through a slot in the other member, as 2. This cross-bar can be employed in lieu of the screw 9 for drawing the clamping members together onto the lens. The screw 10 in this construction engages the cross-bar and when tightened up will draw the latter toward the end wall 4, thus forming a closed pocket for the spring and the ear of the nose-guard and clamping the same tightly in position. As shown in Fig. 4ᵇ, a simple opening may be formed through the cross-bar 12 for the passage of the member 1, and, as shown in Fig. 4ᶜ, the cross-bar may be provided with wings 14, so as to close the space between the cross-bar and the lens, thus preventing the entrance of dirt. In the construction shown in Fig. 5 the cross-bar is provided at both ends with stems 13, one of which is provided with a head and the other one threaded for the reception of the nut 15.

As shown in Figs. 6, 8ª, and 9, one of the legs of the clamp is formed with a lug 16 intermediate of the prongs on such leg. This lug may be provided with a threaded stem 13 and is bent up, so as to form a cross-bar, the threaded stem passing through an opening in the other member in the construction shown in Fig. 6. The legs are drawn together by a nut 15 on the stem, and the screw 10 engages such lug or cross-bar and draws it toward the wall 4, clamping the spring and ear on the nose-guard.

In the construction shown in Figs. 7, 8, and 8ª the lug or cross-bar 16 is not employed for drawing the legs or members 1 and 2 toward each other, but simply forms a portion of a wall for the pocket for the spring and ear of the nose-guard, the legs or members 1 and 2 being drawn together to grip the lens by a screw 9.

In the construction shown in Fig. 7ª one of the members is provided with side wings 14ª, and the cross-bar is formed by bending around a portion 12ª of one of the wings 14ª.

In the construction shown in Fig. 7 a single screw 9 is employed, passing through a bar 21, extending across the members 2, while in the construction shown in Figs. 8 and 8ª two screws 9 are employed, said screws passing through the members 2 and engaging threaded holes in member 1.

Fig. 9 illustrates a construction in which the lug 16 is provided with an angular extension 17, with which the screw 9 engages, to effect the clamping of the legs or members 1 and 2 against the lens.

In the construction shown in Fig. 10 a nut 18 is employed to engage the end of the clamping-screw 10. This nut is preferably made so as to practically fill the space between the legs or members 1 and 2 and has an elongated opening 19 therethrough for the passage of the clamping-screw 9, as shown in Fig. 10ᵇ. In lieu of the construction shown in Fig. 10ᵇ this nut may be provided with side wings 14, which will extend alongside of and past the screw 9 and fill the space between the legs or members 1 and 2 and prevent the entrance of dirt, as shown in Fig. 10ª.

In the construction shown in Figs. 12, 13, and 14 one of the legs or members may be so bent as to form a portion of a wall of the pocket for the reception of the spring and ear of the nose-guard, and it is preferred that this depressed portion should be used as a seat for the nut 20, with which the screws 9 and 10 will engage; but said screws may engage the top and side wall of the depressed portion, as in Fig. 12.

In Fig. 11 is shown a construction of lens-clamp whereby a cord may be connected to the lens, and consists of the members 1 and 2 and their connecting-wall 4. The legs of the clamp are made sufficiently long to provide outside of the screw 9 a loop for the reception of the cord.

I claim herein as my invention—

1. An integral U-shaped lens grip or clamp the legs thereof being provided with means for engaging the lens and to bear upon the nose-guard and spring, means for engaging the legs outside of the periphery of the lens for drawing the legs toward each other, a nose-guard, a spring and means for positively engaging the nose-guard and spring and securing the same within the clamp, substantially as set forth.

2. A U-shaped lens grip or clamp, the legs or free ends of which are provided with means for engaging the lens, a cross-bar arranged between the legs of the clamp and forming with the closed end thereof a pocket for the spring and nose-guard, said cross-bar forming a portion of the means for drawing the legs toward each other and a screw for drawing the cross-bar toward the closed end of the clamp, substantially as set forth.

3. A U-shaped lens grip or clamp, the legs or free ends of which are provided with means for engaging the lens, a cross-bar extending from one leg and provided with threaded stem passing through the other leg, a clamping-nut on threaded stem, and a spring and guard-screw engaging the cross-bar, substantially as set forth.

4. A U-shaped lens grip or clamp, the legs or free ends thereof being provided with means for engaging the lens, in combination with a movable cross-bar arranged between the legs, means for drawing the legs toward the lens and a screw for drawing the cross-bar toward the closed end of the grip or clamp, substantially as set forth.

5. A lens grip or clamp having in combination two clamping members integrally connected by a wall, one of the members having an inwardly-bent portion, one wall of said portion forming a wall of the pocket for the reception of the spring and ear on the nose-guard and one of said members having a recess or depression for the reception of a nut, substantially as set forth.

6. A lens grip or clamp having in combination two clamping members integrally connected by a wall forming a portion of a pocket for the reception of the nose-guard and spring, one of the members being provided with a recess for the reception of a nut, and a screw passing through the members and engaging the nut in said recess, substantially as set forth.

7. A U-shaped lens grip or clamp adapted to grip and hold a lens, the closed end of the grip or clamp forming a pocket for the reception of the spring and ear on the nose-guard, and a screw for securing said parts in the pocket, substantially as set forth.

In testimony whereof I have hereunto set my hand.

GEORGE H. WINSLOW.

Witnesses:
F. E. GAITHER,
FRED KIRCHNER.